United States Patent
Park

(10) Patent No.: US 7,522,501 B2
(45) Date of Patent: *Apr. 21, 2009

(54) RECORDING, REPRODUCING AND PRODUCT FOR MANAGEMENT OF DATA HAVING A TEMPORARY DEFECT MANAGEMENT AREA CONTAINING AT LEAST ONE POINTER

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 435 days.

This patent is subject to a terminal disclaimer.

(21) Appl. No.: 10/840,264

(22) Filed: May 7, 2004

(65) Prior Publication Data

US 2004/0240341 A1    Dec. 2, 2004

Related U.S. Application Data

(60) Provisional application No. 60/469,006, filed on May 9, 2003.

(30) Foreign Application Priority Data

May 20, 2003   (KR) ...................... 10-2003-0031958

(51) Int. Cl.
*G11B 7/00* (2006.01)
(52) U.S. Cl. .............. 369/53.15; 369/53.17; 369/275.3; 714/6
(58) Field of Classification Search .............. 369/275.1, 369/275.4, 47.14, 53.15, 275.3, 53.17, 53.16; 714/6; *G11B 7/007, 20/12, 7/135, 5/09; G06F 11/00*
See application file for complete search history.

(56) References Cited

U.S. PATENT DOCUMENTS

| 4,558,446 A | 12/1985 | Banba et al. |
| 4,733,386 A | 3/1988 | Shimoi |
| 4,807,205 A | 2/1989 | Picard |
| 4,963,866 A | 10/1990 | Duncan |
| 5,068,842 A | 11/1991 | Naito |
| 5,111,444 A | 5/1992 | Fukushima et al. |
| 5,210,734 A | 5/1993 | Sakurai |
| 5,235,585 A | 8/1993 | Bish et al. |
| 5,237,553 A | 8/1993 | Fukushima et al. |

(Continued)

FOREIGN PATENT DOCUMENTS

CN    1134017    10/1996

(Continued)

OTHER PUBLICATIONS

Office Action for corresponding Taiwanese Application No. 09720450190 dated Aug. 25, 2008.

(Continued)

*Primary Examiner*—Nabil Z Hindi
(74) *Attorney, Agent, or Firm*—Harness, Dickey & Pierce

(57) ABSTRACT

The data structure on the recording medium includes a temporary defect management area storing a data block. The data block includes sequential recording information and a temporary definition structure. The sequential recording information provides information on continuous recording areas in the data area of the recording medium. The temporary definition structure includes at least one pointer to information in the temporary defect management area.

38 Claims, 6 Drawing Sheets

* DMA : Defect Management Area
* TDMA : Temporary DMA
* ISA : Inner Spare Area
* OSA : Outer Spare Area
* TDFL : Temporary Defect List
* TDDS : Temporary Disc Definition Structure

U.S. PATENT DOCUMENTS

| | | |
|---|---|---|
| 5,247,494 A | 9/1993 | Ohmo et al. |
| 5,319,626 A | 6/1994 | Ozaki et al. |
| 5,404,357 A | 4/1995 | Ito et al. |
| 5,442,611 A | 8/1995 | Hosaka |
| 5,448,728 A | 9/1995 | Takano et al. |
| 5,475,820 A * | 12/1995 | Natrasevschi et al. ........ 711/100 |
| 5,481,519 A | 1/1996 | Hosoya |
| 5,495,466 A | 2/1996 | Dohmeier et al. |
| 5,528,571 A | 6/1996 | Funahashi et al. |
| 5,553,045 A | 9/1996 | Obata |
| 5,577,194 A | 11/1996 | Wells et al. |
| 5,608,715 A | 3/1997 | Yokogawa et al. |
| 5,715,221 A | 2/1998 | Ito et al. |
| 5,720,030 A | 2/1998 | Kamihara et al. |
| 5,732,053 A | 3/1998 | Yano et al. |
| 5,740,435 A | 4/1998 | Yamamoto et al. |
| 5,745,444 A | 4/1998 | Ichikawa et al. |
| 5,799,212 A | 8/1998 | Ohmori |
| 5,802,028 A | 9/1998 | Igarashi |
| 5,805,536 A | 9/1998 | Gage et al. |
| 5,825,726 A | 10/1998 | Hwang et al. |
| 5,848,038 A | 12/1998 | Igarashi |
| 5,867,455 A | 2/1999 | Miyamoto et al. |
| 5,878,020 A * | 3/1999 | Takahashi ................ 369/59.25 |
| 5,914,928 A | 6/1999 | Takahashi |
| 6,058,085 A | 5/2000 | Obata |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma |
| 6,341,278 B1 | 1/2002 | Yamamoto et al. |
| 6,373,800 B1 | 4/2002 | Takahashi |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko |
| 6,469,978 B1 * | 10/2002 | Ohata et al. .............. 369/275.3 |
| 6,477,126 B1 | 11/2002 | Park et al. |
| 6,480,446 B1 | 11/2002 | Ko |
| 6,493,301 B1 | 12/2002 | Park |
| 6,529,458 B1 | 3/2003 | Shin |
| 6,542,450 B1 | 4/2003 | Park |
| 6,564,345 B1 * | 5/2003 | Kim et al. ................... 714/723 |
| 6,581,167 B1 | 6/2003 | Gotoh et al. |
| 6,594,209 B2 | 7/2003 | Ijtsma et al. |
| 6,606,285 B1 | 8/2003 | Ijtsma et al. |
| 6,615,363 B1 | 9/2003 | Fukasawa |
| 6,631,106 B1 | 10/2003 | Numata et al. |
| 6,633,724 B1 | 10/2003 | Hasegawa et al. |
| 6,667,939 B1 | 12/2003 | Miyamoto |
| 6,671,249 B2 | 12/2003 | Horie |
| 6,697,306 B2 | 2/2004 | Sako |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama |
| 6,766,418 B1 | 7/2004 | Alexander et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki |
| 6,934,236 B2 | 8/2005 | Lee et al. |
| 6,999,398 B2 | 2/2006 | Yamamoto et al. |
| 7,002,882 B2 | 2/2006 | Takahashi |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 * | 1/2007 | Hwang et al. ............ 369/47.14 |
| 7,184,377 B2 | 2/2007 | Ito et al. |
| 7,188,271 B2 * | 3/2007 | Park et al. ...................... 714/6 |
| 7,233,550 B2 | 6/2007 | Park et al. |
| 7,236,687 B2 * | 6/2007 | Kato et al. .................... 386/95 |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,379,402 B2 * | 5/2008 | Ko et al. .................. 369/53.17 |
| 2001/0009537 A1 | 7/2001 | Park |
| 2001/0011267 A1 | 8/2001 | Kihara et al. |
| 2001/0026511 A1 | 10/2001 | Ueda et al. |
| 2001/0043525 A1 | 11/2001 | Ito et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 | 4/2004 | Hwang et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0223427 A1 | 11/2004 | Kim et al. |
| 2004/0246851 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |
| 2005/0052972 A1 | 3/2005 | Park |
| 2005/0052973 A1 | 3/2005 | Park |
| 2005/0055500 A1 | 3/2005 | Park |
| 2005/0060489 A1 | 3/2005 | Park |
| 2005/0068877 A1 | 3/2005 | Yeo |

| | | | |
|---|---|---|---|
| 2005/0083740 A1 | 4/2005 | Kobayashi | |
| 2005/0083767 A1 | 4/2005 | Terada et al. | |
| 2005/0083830 A1 | 4/2005 | Martens et al. | |
| 2005/0195716 A1 | 9/2005 | Ko et al. | |
| 2005/0207262 A1 | 9/2005 | Terada et al. | |
| 2005/0289389 A1 | 12/2005 | Yamagami et al. | |
| 2006/0077827 A1 | 4/2006 | Takahashi | |
| 2006/0195719 A1 | 8/2006 | Ueda et al. | |
| 2006/0203635 A1 | 9/2006 | Ko et al. | |
| 2006/0203638 A1 | 9/2006 | Ko et al. | |
| 2006/0203684 A1 | 9/2006 | Ko et al. | |
| 2006/0227694 A1 | 10/2006 | Woerlee et al. | |
| 2007/0294571 A1 | 12/2007 | Park et al. | |
| 2008/0046780 A1 | 2/2008 | Shibuya et al. | |

FOREIGN PATENT DOCUMENTS

| | | |
|---|---|---|
| CN | 1140897 | 1/1997 |
| CN | 1227950 | 9/1999 |
| CN | 1273419 | 11/2000 |
| CN | 1675708 | 9/2005 |
| CN | 1685426 | 10/2005 |
| DE | 199 54 054 | 6/2000 |
| EP | 0 314 186 | 5/1989 |
| EP | 0 325 823 | 8/1989 |
| EP | 0 350 920 | 1/1990 |
| EP | 0 464 811 A2 | 1/1992 |
| EP | 0 472 484 | 2/1992 |
| EP | 0 477 503 | 4/1992 |
| EP | 0 556 046 | 8/1993 |
| EP | 0 871 172 | 10/1998 |
| EP | 0 908 882 | 4/1999 |
| EP | 0 974 967 | 1/2000 |
| EP | 0 989 554 | 3/2000 |
| EP | 0 997 904 | 5/2000 |
| EP | 1 026 681 | 8/2000 |
| EP | 1 043 723 | 10/2000 |
| EP | 1 132 914 | 9/2001 |
| EP | 1 148 493 | 10/2001 |
| EP | 1 152 414 | 11/2001 |
| EP | 1 239 478 | 9/2002 |
| EP | 1 274 081 | 1/2003 |
| EP | 1 298 659 | 4/2003 |
| EP | 1 321 940 | 6/2003 |
| EP | 1 329 888 | 7/2003 |
| EP | 1 347 452 | 9/2003 |
| EP | 1 564 740 | 8/2005 |
| EP | 1 612 790 | 1/2006 |
| GB | 2 356 735 | 5/2001 |
| JP | 63-091842 | 4/1988 |
| JP | 1-263955 | 10/1989 |
| JP | 2-023417 | 1/1990 |
| JP | 5-274814 | 10/1993 |
| JP | 6-349201 | 12/1994 |
| JP | 8-096522 | 4/1996 |
| JP | 9-145634 | 6/1997 |
| JP | 9-231053 | 9/1997 |
| JP | 10-050005 | 2/1998 |
| JP | 10-050032 | 2/1998 |
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 | 7/1998 |
| JP | 11-110888 | 4/1999 |
| JP | 11-203792 | 7/1999 |
| JP | 2000-090588 | 3/2000 |
| JP | 2000-149449 | 5/2000 |
| JP | 2000-195178 | 7/2000 |
| JP | 2000-215612 | 8/2000 |
| JP | 2000-285607 | 10/2000 |
| JP | 2001-023317 | 1/2001 |
| JP | 2001-069440 | 3/2001 |
| JP | 2001-110168 | 4/2001 |
| JP | 2001-148166 | 5/2001 |
| JP | 2001-351334 | 12/2001 |
| JP | 2001-357623 | 12/2001 |
| JP | 2002-015507 | 1/2002 |
| JP | 2002-015525 | 1/2002 |
| JP | 2002-056619 | 2/2002 |
| JP | 2002-215612 | 8/2002 |
| JP | 2002-245723 | 8/2002 |
| JP | 2002-288938 | 10/2002 |
| JP | 2002-329321 | 11/2002 |
| JP | 2002-352522 | 12/2002 |
| JP | 2004-280864 | 10/2004 |
| JP | 2004-280865 | 10/2004 |
| JP | 2005-004912 | 1/2005 |
| JP | 2005-535993 | 11/2005 |
| JP | 2005-538490 | 12/2005 |
| JP | 2005-538491 | 12/2005 |
| JP | 2005-519445 | 8/2006 |
| KR | 10-2004-0094301 | 11/2004 |
| TW | 371752 | 10/1999 |
| TW | 413805 | 12/2000 |
| WO | WO 84/00628 | 2/1984 |
| WO | WO 96/30902 | 10/1996 |
| WO | WO 97/22182 | 6/1997 |
| WO | WO 00/54274 | 9/2000 |
| WO | WO 01/22416 | 3/2001 |
| WO | WO 01/93035 | 12/2001 |
| WO | WO 03/007296 | 1/2003 |
| WO | WO 03/025924 | 3/2003 |
| WO | WO 03/079353 | 9/2003 |
| WO | WO 2004/015707 | 2/2004 |
| WO | WO 2004/015708 | 2/2004 |
| WO | WO 2004/025648 | 3/2004 |
| WO | WO 2004/025649 | 3/2004 |
| WO | WO 2004/029668 | 4/2004 |
| WO | WO 2004/029941 | 4/2004 |
| WO | WO 2004/034396 | 4/2004 |
| WO | WO 2004/036561 | 4/2004 |
| WO | WO 2004/053872 | 6/2004 |
| WO | WO 2004/053874 | 6/2004 |
| WO | WO 2004/068476 | 8/2004 |
| WO | WO 2004/075180 | 9/2004 |
| WO | WO 2004/079631 | 9/2004 |
| WO | WO 2004/079731 | 9/2004 |
| WO | WO 2004/079740 | 9/2004 |
| WO | WO 2004/081926 | 9/2004 |
| WO | WO 2004/093035 | 10/2004 |
| WO | WO 2004/100155 | 11/2004 |
| WO | WO 2004/100156 | 11/2004 |
| WO | WO 2005/004123 | 1/2005 |
| WO | WO 2005/004154 | 1/2005 |

OTHER PUBLICATIONS

"JIS Handbook Data Processing for Hardware," Japanese Standards Association Inc., Japan, Apr. 21, 1999, pp. 1064-1070.
International Search Report and Written Opinion dated Aug. 31, 2004.
International Search Report and Written Opinion dated Jan. 13, 2006.
International Search Report and Written Opinion dated Mar. 8, 2007.
Office Action for corresponding Russian Application No. 2006111473/28(012477) dated Dec. 26, 2008.
Search Report for corresponding European Application No. 07110035.8 dated Jun. 5, 2008.
Office Action for corresponding Russian Application No. 2006104619/28 dated Jun. 26, 2008.

* cited by examiner

*LRA : Last Recorded Address

FIG. 2B

| Byte position in Data Frame | Contents | | number of bytes |
|---|---|---|---|
| 0 | | Track Info Structure identifier | 2 |
| 2 | Track Info Header | Track Info format = 00h | 1 |
| 3 | | reserved and set to 00h | 1 |
| 4 | | Layer number (0 or 1) | 4 |
| 8 | | Total number of tracks | 4 |
| 12 | | Total number of open tracks | 4 |
| 16 | List of Track Info | | n * 8 |
| n * 8 | Track Info List Terminator | | |
| | Reserved and set to 00h | | |

| b63..b60 | b59..b32 | b31..b28 | b27..b0 |
|---|---|---|---|
| Track status | Start PSN of Track #n | reserved | LRA of Track #n |
| Track status | Start PSN of Track #n+1 | reserved | LRA of Track #n+1 |
| Track status | Start PSN of Track #n+2 | reserved | LRA of Track #n+2 |
| ... | ... | ... | ... |

Track Status
0000b : Open Track
1000b : Complete Track
0001b : Intermediate Track

RECORDING, REPRODUCING AND PRODUCT FOR MANAGEMENT OF DATA HAVING A TEMPORARY DEFECT MANAGEMENT AREA CONTAINING AT LEAST ONE POINTER

FOREIGN PRIORITY

The present invention claims priority under 35 U.S.C. 119 on U.S. Provisional Application No. 60/469,006 filed on May 9, 2003 and Korean Application No. 10-2003-031958 filed on May 20, 2003; the contents of which are incorporated by reference in their entirety.

BACKGROUND OF THE INVENTION

1. Field of the Invention

The present invention relates to a recording medium having a data structure for managing at least a data area of the recording medium as well as methods and apparatuses for reproduction and recording.

2. Description of the Related Art

The standardization of new high-density read only and rewritable optical disks capable of recording large amounts of data has been progressing rapidly and new optical disk related products are expected to be commercially available in the near future. For example, the blu-ray disc (BD), which belongs to the next-generation HD-DVD technology, is the next-generation optical recording solution that can strikingly surpass the data recording capability of existing DVDs.

Recording on and reading from a BD uses a celadon laser having a wavelength of 405 nm, which is much denser than a red laser having a wavelength of 650 nm used with existing DVDs. Thus, a greater amount of data may be stored on BD than on existing DVDs.

While at least one standard related to the BD (Blu-ray Disc) has been developed, such as BD-RE (BD Rewritable disc), many other standards such as BD-WO (BD Write Once disc) are still in development. Standards such as BD-RE provide a data structure for managing defects in the data area of the recording medium. However, the BD-WO, because of its write-once nature, presents challenges not faced by existing BD standards such as BD-RE, and an effective data structure and method of managing defects is still under development for the BD-WO standard.

SUMMARY OF THE INVENTION

The recording medium according to the present invention includes a data structure for managing at least a data area of the recording medium.

In one exemplary embodiment, a temporary defect management area of the recording medium stores a first data block that includes sequential recording information and a temporary definition structure. The sequential recording information provides information on continuous recording areas in the data area of the recording medium. The temporary definition structure includes at least one pointer to information in the temporary defect management area.

In one embodiment, the sequential recording information includes a header, information entries for each continuous recording area and a terminator. The header identifies the sequential recording information as sequential recording information. Each information entry provides information on an associated continuous recording area, and the terminator indicates an end of the sequential recording information.

In one embodiment, the header information indicates a number of the continuous recording areas and a number of the continuous recording areas open for recording.

In an example embodiment, each information entry indicates a status of the associated continuous recording area, indicates a starting physical sector number of the associated continuous recording area, and indicates a last recording address of the associated continuous recording area.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE EMBODIMENTS

In order that the invention may be fully understood, exemplary embodiments thereof will now be described with reference to the accompanying drawings. For convenience, a write-once optical Blu-ray disc will be used as an example of a write-once recording medium in the exemplary embodiments.

Kinds of Tracks and Data Structure of the Recording Medium

Figure 1:
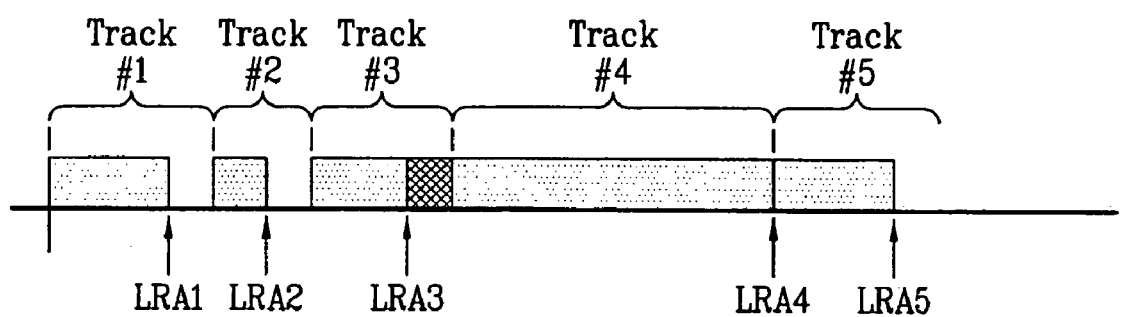
FIG. 1 illustrates the different kinds of basic tracks of a write-once optical disc according to an example embodiment of the present invention.
Figure 2:
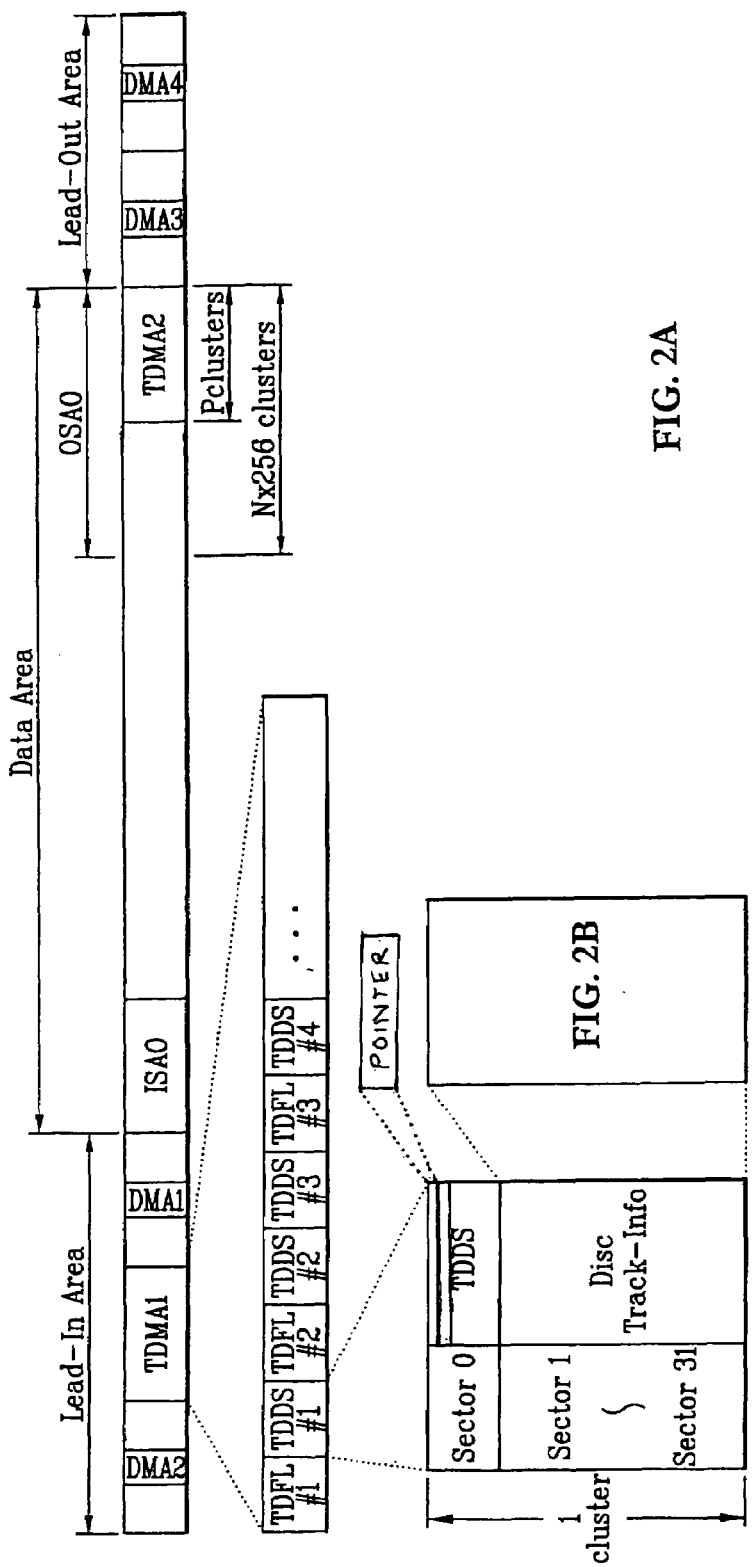
FIGS. 2A and 2B illustrate a data structure of the write-once optical disc, and more specifically, the temporary disc management information according to an embodiment of the present invention.

Referring to FIGS. 1, 2A-2B and 3, the kinds of tracks and physical structure of the disc according to an example embodiment of the of the present invention will be described. A continuous recording area in which data is sequentially recorded will be referred to as a track in this disclosure. FIG. 1 illustrates the different kinds of basic tracks of a write-once optical disc according to an example embodiment of the present invention. More specifically, FIG. 1 illustrates a plurality of continuous recording areas or tracks having different status assuming use of the write-once disc over a period of time. As shown, tracks 1 and 2 correspond to open tracks that while storing data in a first area thereof, each have a later area on which additional recording is possible. The tracks 3 and 4 correspond to complete or closed tracks that are completely filled (track 4) or are closed for further recording (track 3). As shown by track 3, when a track having an unrecorded area is closed such that no further recording in the track is permitted, the unrecorded area is padded with zeros (shown as a hatched portion in FIG. 1) and changed to be a complete track. Track 3 is different from track 4 in that point.

Track 5 provides an example of the last track that includes area on which additional recording is possible. This track is called an intermediate track. Accordingly, there are three kinds of tracks—open, closed and intermediate.

Each of the tracks has a last recorded address (LRA) regardless of the kind of the track. The LRA is the last address at which actual data was recorded in the track. Accordingly, with respect to track 3, the position (or address) before the track 3 was padded with zeros is the LRA for track 3 (LRA3). More specifically, assuming the unit for recording data on the optical disc is a cluster, and there are 32 sectors in one cluster, if less than the 32 sectors have data recorded therein, then the remaining sectors are padded with zeros. The last sector address before the padding is the LRA.

For each of the open and intermediate tracks, but not the closed tracks, a next writable address (NWA) indicating the next address into which data may be written may be determined. The NWA is obtained from the LRA as the next sector address following the LRA.

FIGS. 2A and 2B illustrate a data structure of the write-once optical disc, and more specifically, temporary disc management information according to an embodiment of the present invention. The configuration of the write-once optical disc shown in FIG. 2A is described in detail in Korea Patent Application No. 2003-15634.

As shown, the write-once optical disc in this example is a single layer disc that has one recording layer. The disc includes spare areas (ISA0/ISA1) for recording data the could not be recorded in the main data area because of defects in the main data area (e.g., physical defects). Information for managing the replacement of defect portions of the data area with portions of the spare area is recorded in a temporary defect management area or areas (TDMA).

In general, a rewritable, as opposed to a write-once, optical disc has a limited defect management area (DMA) because data can be written and erased from the DMA repeatedly. A write-once optical disc needs a larger amount of to manage defects since data can be written only once and not erased. Accordingly, the TDMA is used for recording the defect management information as this information changes during use of the optical disc. Once the disc is complete, the last version of the defect management information is copied from the TDMA to a DMA on the write-once optical disc.

Referring to FIG. 2A, the TDMA includes TDMA1 allocated to a lead-in area having a fixed size and TDMA2 allocated to spare area OSA0. The TDMA2 has a size interworking with the size of the spare area. For example, the size of the spare area OSA0 is N*256 cluster, of which the TDMA2 forms P clusters. The number of clusters P may be determined according to the expression P=(N*256)/4). In each TDMA, temporary defect management information in the form of a temporary defect list (TDFL), a temporary disc definition structure (TDDS), and disc use status information may be recorded.

As discussed above, when a defect area exists in the data area, a spare area (ISA0/OSA0) is substituted for the defect area. The TDFL provides information to manage this process in the form of a list. For example, the list indicates the defect area and the spare area replacing the defect area. According to one embodiment of the present invention, the size of the TDFL, varies from 1 to 4 clusters depending on the amount of information in the TDFL. By contrast, according to one example embodiment of the present invention, the amount of space devoted to the TDDS remain fixed at one cluster. According to this embodiment, this data block includes the TDDS and disc usage status information as discussed in detail below with respect to FIGS. 3 and 2B.

Figure 3:
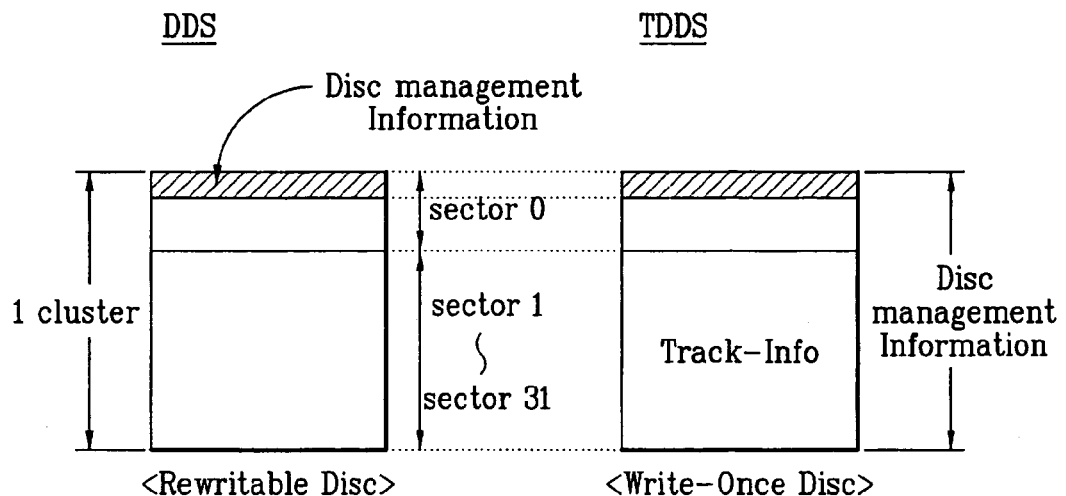
FIG. 3 illustrates a comparison of the disc management information of a conventional rewritable optical disc to the disc management information of the present invention.

Referring first to FIG. 3, the disc management information of the conventional rewritable optical disc will be compared with the contents included in the TDDS of the present invention.

In the case of a rewritable optical disk, the DDS consumes a very small portion of the disc—about 60 bytes of one cluster (one cluster having 32 sectors). The remaining area of the cluster is set by 'zero padding'. However, according to this embodiment of the present invention, the remaining area as well as the area (60 bytes) used in the conventional rewritable optical disk is used as disc management information. Accordingly, in the TDDS of the present invention, information particular to a write-once optical disc as well as DDS as used in the conventional rewritable optical disc is recorded sequentially in one sector (2048 bytes). For example, the information particular to the write-once optical disc may be position information of the latest TDFL.

As shown in FIG. 2A and 3, the sequential recording or, more particularly, the track information according to an embodiment of the present invention is recorded on the remaining 31 sectors of one cluster that includes the TDDS. Alternatively, the track information may be configured in 31 sectors in the front of TDDS and the TDDS may be configured on the last, $32^{nd}$ sector.

Accordingly, the TDDS as used in this disclosure should be construed broadly as described above and not as a term defined according to one particular standard.

Data Structure of Track Information on the Recording Medium

First, the present invention does not limit the number of the open tracks. Accordingly, there may exist a plurality of open tracks and complete tracks. The present invention provides a data structure on the recording medium for managing this potential in an efficient manner. An embodiment of this track information data structure will now be described in detail with respect to FIG. 2B.

As shown, the sequential recording, or more particularly, the track information includes three parts: a header for indicating that the data structure provides track information, a track information list providing the track information, and an terminator indicating an end of the track information.

The header is positioned at the front portion of the track information and includes a 'track information structure identifier' field indicating that information following the identifier is track information. The next indicator 'track information format' indicates the format of the track information. This is followed by a 'layer number (0 or 1)' field representing the recording layer to which the track information corresponds. While the example thus far has been for a single sided, single recording layer write-once optical disc, the optical disc may have multiple recording layers and/or be double sided.

The header further includes a 'total number of tracks' field representing the number tracks in the data area of the recording layer to which the track information corresponds, and 'total number of open tracks' field representing the number of the open tracks in this data area. Before reading the track information list, the total track information may be confirmed.

The track information list is recorded after the header and will be described in greater detail below. The track information list terminator represents the end of the track information. Accordingly, the track information includes a header, track information list and a terminator recorded in series.

An example embodiment of the track information list will now be described in more detailed. The track information list includes one entry for each track in the corresponding data area of the disc. Each entry may be allocated to, for example, 8 bytes. This track information entry includes track status information, a first address of the corresponding track and the last recorded address information of the track.

The track status information indicates the kind of track—open, closed or intermediate, and may be represented by 4 bits as shown in FIG. 3B. In this embodiment of the present invention, an open track in which additional recording is possible is indicated by '0000b' as the track status information. An intermediate track is indicated by '0001b' as the track status information, and a complete track, in which additional recording is not permitted, is indicated by '1000b' as the track status information. The track status information is represented as specific bits as described above to aid in sorting the track information list entries as described later in this disclosure.

In the example of FIG. 2B, the first address information of an entry is a 'start physical sector number (PSN) of track' field. This field provides the sector address of the first sector forming the track. The last recorded address information in the example of FIG. 3B is the LRA of the track. Accordingly, if one entry is read, the kind of track, the start position and LRA of the track may be determined.

The track status information in each entry may also include a session start status (e.g., one of the bits in the track status information in each entry may be used as the session start bit). The session status indicates if the track is the first track or not the first track in a session. Here, the clustering of tracks into a group is called a session.

Track Information Update Method

When to update the track information may be a design parameter established according to the system or system designer. However, examples of events triggering update will be described in detail below.

When a new track is generated or a track is closed, since the track information is newly generated, the track information may be updated. When a disc is ejected from a driver or the power to the driver is turned off, use of the disc is stopped at least temporarily. At these times, the track information is updated.

Figure 4:
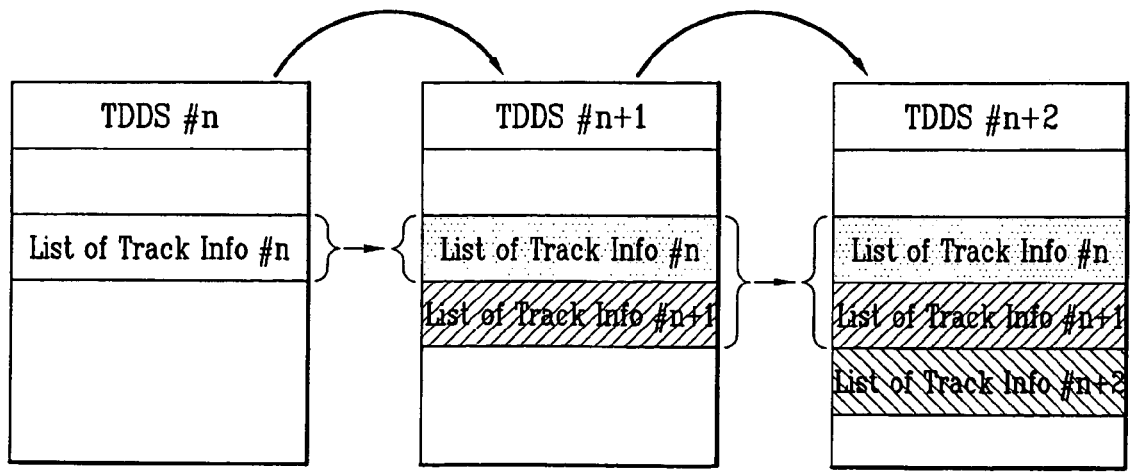
FIGS. 4 and 5 illustrate two example embodiments of a method of updating the track information according to the present invention.
Figure 5:
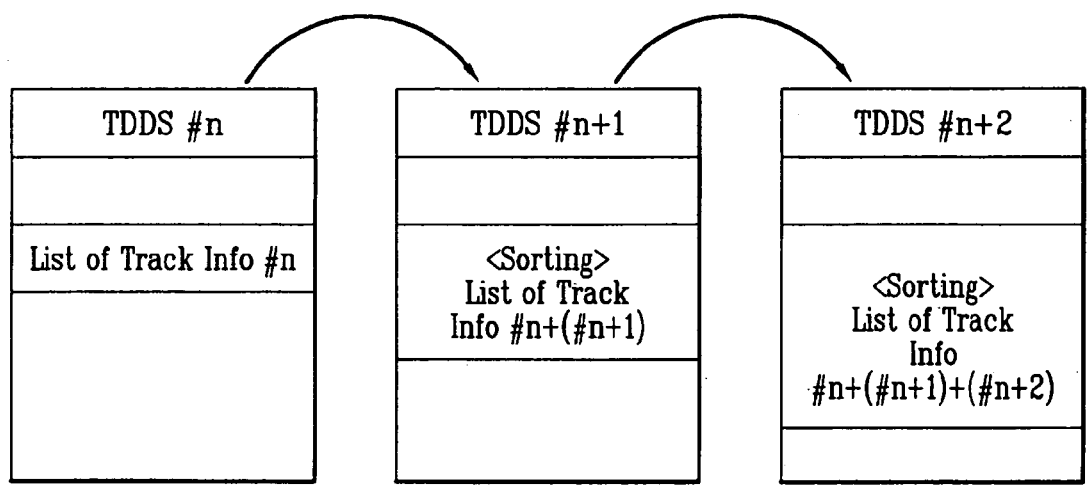

FIGS. 4 and 5 illustrate two example embodiments of a method of updating the track information according to the present invention. As shown in FIG. 4, the track information in a preceding step and the track information to be updated now are separate and recorded separately. In this method, the track information previously recorded is included in the current recording such that the track information is recorded cumulatively.

More specifically, to record the track information updated at time n+1, the track information recorded at time n and the track information at time n+1 are recorded sequentially. In other words, the track information in the preceding track recording step is included, but recorded separately from current track information. Similarly when updating the track information at time n+2, the track information recorded at time n and n+1 is included, but recorded separately.

The advantage of this embodiment is that the contents of the track information at each stage of disc usage is recorded in sequential order. It is easy to confirm the usage status of the disc. If only the latest track information is recorded, it would be more difficult to access the previous track information and require a longer time to access this information.

FIG. 5 illustrates another embodiment of a method of updating the track information according to the present invention. The track information previously recorded and the track information to be updated now are included and recorded cumulatively. However, prior to recording, the track information list is sorted and recorded in a specific order.

More specifically, to record the track information updated at time n+1, the track information recorded at time n and the track information to be updated now at time n+1 are considered as one track information list and sorted. The sorted version of the track information is then recorded in a specific order.

For example, the track information list entries may be sorted by track status (i.e., the kind of track). Using the format of the track status information described above with respect to FIG. 2B as an example, the entries of the open tracks that have '0000b' as track status information come first. Next, entries of the complete tracks that have '1000b' as the track status information are recorded, and last, the entries of the intermediate track that have '0001b' as track status information are recorded. For entries having the same track status information, the entries are sorted by the first address information such that the entries having smaller addresses are recorded first.

Another method is also possible. For example at first the track information list entries may be sorted by the first address information such that the entries having smaller addresses are recorded first. It should be understood that these are merely examples of the sorting that may take place, and that a system designer may adopt other basis for sorting that fall within the spirit and scope of the present invention.

The advantage of this embodiment of the present invention is that information on the tracks in a disc are sorted according to their kind so that the information related to a kind of track (e.g., open track) may be easily obtained. Also, because the track information for each track is recorded in the updating, the track information for the data area is easily and quickly accessible.

The two embodiments described above are complementary to each other. The system or user may select and use the method suitable to their environment.

Figure 6:
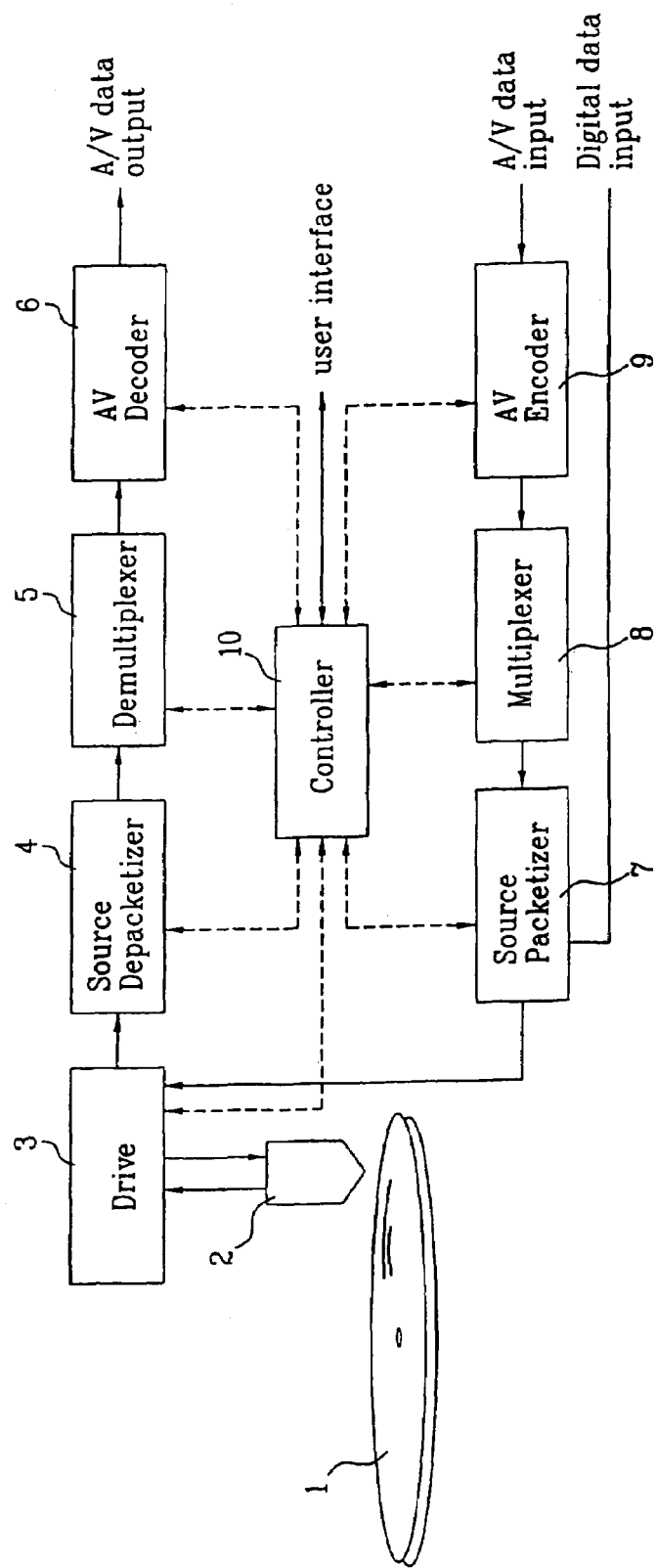
FIG. 6 illustrates an embodiment of a recording and reproducing apparatus according to the present invention.

FIG. 6 illustrates a schematic diagram of an embodiment of an optical disk recording and reproducing apparatus according to the present invention. As shown, an encoder 9 receives and encodes data (e.g., still image data, audio data, video data, etc.). The encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 6, the operations of the encoder 9, the multiplexer 8 and the source packetizer 7 are controlled by a controller 10. The controller 10 receives user input on the recording operation, and provides control information to encoder 9, multiplexer 8 and the source packetizer 7. For example, the controller 10 instructs the encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, the controller 10 controls the drive 3 to record one or more of the data structures of FIGS. 1-3 on the optical disk.

During reproduction or further recording operations, the controller 10 may control the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce and/or record data from/to the optical disk as discussed in detail above.

Reproduced source packets are received by a source depacketizer 4 and converted into a data stream (e.g., an MPEG-2 transport packet stream). A demultiplexer 5 demultiplexes the data stream into encoded data. A decoder 6 decodes the encoded data to produce the original data that was fed to the encoder 9. During reproduction, the controller 10 controls the operation of the source depacketizer 4, demultiplexer 5 and decoder 6. The controller 10 receives user input on the reproducing operation, and provides control information to decoder 6, demultiplexer 5 and the source packetizer 4. For example, the controller 10 instructs the decoder 9 on the type of decoding to perform, instructs the demultiplexer 5 on the transport stream to demultiplex, and instructs the source depacketizer 4 on the source packet format.

While FIG. 6 has been described as a recording and reproducing apparatus, it will be understood that only a recording or only a reproducing apparatus may be provided using those portions of FIG. 6 providing the recording or reproducing function.

The write-once optical disc management data structure and method of recording and reproducing this data structure as well as updating the management data provide information regarding the use of the recording medium to sequentially store data in continuous recording areas (e.g., tracks). This data structure and these methods remain applicable for the case where the number of the open tracks, in which additional recording is possible, is not limited.

The data structure for and method for managing at least a data area of a high-density recording medium in accordance with embodiments of the present invention enables an efficient and progressive use of a write-once recording medium such as BD-WO.

As apparent from the above description, the present invention also provides apparatuses for recording a data structure on a high density recording medium for managing at least a data area of the recording medium.

While the invention has been disclosed with respect to a limited number of embodiments, those skilled in the art, having the benefit of this disclosure, will appreciate numerous modifications and variations there from. For example, while described with respect to a Blu-ray Write-Once optical disk in several instances, the present invention is not limited to this standard of optical disk or to optical disks. It is intended that all such modifications and variations fall within the spirit and scope of the invention.

What is claimed is:

1. A recording medium having a data structure for managing a data area of a recording medium, comprising:
    a temporary defect management area storing a first data block, the first data block including sequential recording information and a temporary definition structure, the sequential recording information providing information on continuous recording areas in the data area of the recording medium, the temporary definition structure including at least one pointer to information in the temporary defect management area.

2. The recording medium of claim 1, wherein the first data block has a size of at least one cluster.

3. The recording medium of claim 2, wherein one sector of the first data block is devoted to the temporary definition structure and at most 31 sectors of the first data block are devoted to the sequential recording information.

4. The recording medium of claim 3, wherein a first sector of the sequential recording information is located adjacent to the temporary definition structure.

5. The recording medium of claim 1, wherein the sequential recording information includes a header, information entries for each continuous recording area and a terminator, the header identifying the sequential recording information as sequential recording information, each information entry providing information on an associated continuous recording area, and the terminator indicating an end of the sequential recording information.

6. The recording medium of claim 5, wherein the header information indicates a number of the continuous recording areas.

7. The recording medium of claim 6, wherein the header information indicates a number of the continuous recording areas open for recording.

8. The recording medium of claim 5, wherein the header information indicates a number of the continuous recording areas open for recording.

9. The recording medium of claim 5, wherein each information entry indicates whether the associated continuous recording area is a first continuous recording area in a group of continuous recording areas.

10. The recording medium of claim 5, wherein each information entry indicates whether the associated continuous recording area is open for recording.

11. The recording medium of claim 5, wherein each information entry indicates a starting physical sector number of the associated continuous recording area.

12. The recording medium of claim 5, wherein each information entry indicates a last recording address of the associated continuous recording area.

13. The recording medium of claim 5, wherein each information entry indicates a status of the associated continuous recording area, indicates a starting physical sector number of the associated continuous recording area, and indicates a last recording address of the associated continuous recording area.

14. The recording medium of claim 13, wherein the status indicates whether the associated continuous recording area is a start of a group of continuous recording areas.

15. The recording medium of claim 1, wherein the temporary definition structure includes a pointer to a temporary defect list in the temporary defect management area, the temporary defect list indicating defects in the data area.

16. The recording medium of claim 1, wherein the temporary defect management area comprises:
    a second data block, the second data block including a later recorded sequential recording information as compared to the first data block, the later recorded sequential recording information including the sequential recording information of the first data block and new sequential recording information.

17. The recording medium of claim 16, wherein
    the sequential recording information in the first and second data blocks each include a header, information entries for each continuous recording area and a terminator, the header identifying the sequential recording information as sequential recording information, each information entry providing information on an associated continuous recording area, and the terminator indicating an end of the sequential recording information; and
    the information entries in the sequential recording information in the first and second data blocks are sorted by entry into the sequential recording information.

18. The recording medium of claim 16, wherein
the sequential recording information in the first and second data blocks each include a header, information entries for each continuous recording area and a terminator, the header identifying the sequential recording information as sequential recording information, each information entry providing information on an associated continuous recording area, and the terminator indicating an end of the sequential recording information; and each information entry in the sequential recording information in the first and second data blocks includes a status indicator indicating a status of the associated continuous recording area; and the information entries in the sequential recording information in the first and second data blocks are sorted by status.

19. A method of recording management data on a recording medium, comprising:
recording a first data block in a temporary defect management area, the first data block including sequential recording information and a temporary definition structure, the sequential recording information providing information on continuous recording areas in the data area of the recording medium, the temporary definition structure including at least one pointer to information in the temporary defect management area.

20. A method of reproducing data from a recording medium, comprising:
reproducing at least a portion of data recorded on the recording medium based on a data block recorded in a temporary defect management area of the recording medium, the data block including sequential recording information and a temporary definition structure, the sequential recording information providing information on continuous recording areas in the data area of the recording medium, the temporary definition structure including at least one pointer to information in the temporary defect management area.

21. An apparatus for recording management data on a recording medium, comprising:
an optical pickup configured to record data on the recording medium; and
a controller, operatively coupled to the optical pickup, configured to control the optical pickup to record a first data block in a temporary defect management area, the first data block including sequential recording information and a temporary definition structure, the sequential recording information providing information on continuous recording areas in the data area of the recording medium, the temporary definition structure including at least one pointer to information in the temporary defect management area.

22. The method of claim 19, wherein the first data block has a plurality of sectors and one sector of the first data block is devoted to the temporary definition structure and remaining sectors of the first data block are devoted to the sequential recording information.

23. The method of cliam 22, wherein the temporary definition structure is recorded in a last sector of the first data block.

24. The method of claim 22, wherein the temporary definition structure is recorded in a first sector of the first data block.

25. The method of claim 19, the method further comprising:
recording a second data block, the second data block including a later recorded sequential recording information as compared to the first data block, the later recorded sequential recording information including the sequential recording information of the first data block and new sequential recording information.

26. The method of claim 20, wherein the data block has a plurality of sectors and one sector of the data block is devoted to the temporary definition structure and remaining sectors of the data block are devoted to the sequential recording information.

27. The method of claim 26, wherein the temporary definition structure is reproduced from a last sector of the data block.

28. The method of claim 26, wherein the temporary definition structure is reproduced from a first sector of the data block.

29. The apparatus of claim 21, further comprising:
an encoder, operatively controlled by the controller, configured to receive and encode input data;
a multiplexer, operatively controlled by the controller, configured to multiplex the encoded data based on the coding information and stream attribute information to create a transport stream; and
a source packetizer, operatively controlled by the controller, configured to packetize the transport stream from the multiplexer into the source packets.

30. The apparatus of claim 21, wherein the first data block has a plurality of sectors and the controller configured to control the optical pickup to record the temporary definition structure in one sector of the first data block and the sequnetial recording information in remaining sectors of the first data block.

31. The apparatus of claim 30, the controller configured to control the optical pickup to record the temporary definition structure in a last sector of the first data block.

32. The apparatus of claim 30, the controller configured to control the optical pickup to record the temporary definition structure in a first sector of the first data block.

33. The apparatus of claim 21, the controller configured to further control the optical pickup to record a second data block, the second data block including a later recorded sequential recording information as compared to the first data block, the later recorded sequential recording information including the sequential recording information of the first data block and new sequential recording information.

34. An apparatus for reproducing data from a recording medium, comprising:
an optical pickup configured to reproduce data from the recording medium; and
a controller, operatively coupled to the optical pickup, configured to control the optical pickup to reproduce a data block in a temporary defect management area, the data block including sequential recording information and a temporary definition structure, the sequential recording information providing information on continuous recording areas in the data area of the recording medium, the temporary definition structure including at least one pointer to information in the temporary defect management area.

35. The apparatus of claim 34, further comprising:

a source depacketizer, operatively controlled by the controller, configured to convert source packets received from the drive into a data stream;

a demultiplexer, operatively controlled by the controller, configured to demultiples the data stream into encoded data; and a decoder, operatively controlled by the controller, configured to decode the encoded data to produce original data.

36. The apparatus of claim 34, wherein the data block has a plurality of sectors and the controller configured to control the optical pickup to reproduce the temporary definition structure from one sector of the data block and the sequential recording information from remaining sectors of the data block.

37. The apparatus of claim 36, the controller configured to control the optical pickup to reproduce the temporary definition structure from a last sector of the data block.

38. The apparatus of claim 36, the controller configured to control the optical pickup to reproduce the temporary definition structure from a first sector of the data block.

* * * * *